United States Patent
Heinrich et al.

(10) Patent No.: US 9,909,540 B2
(45) Date of Patent: Mar. 6, 2018

(54) METHOD AND DEVICE FOR OPERATING AN INTERNAL COMBUSTION ENGINE

(75) Inventors: Stephan Heinrich, Pfeffenhausen (DE); Brian Woods, Chatham (CA); David W. Balsdon, Chatham (CA); Philippe Grass, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 221 days.

(21) Appl. No.: 13/879,596

(22) PCT Filed: Oct. 13, 2011

(86) PCT No.: PCT/EP2011/067850
§ 371 (c)(1),
(2), (4) Date: Jun. 24, 2013

(87) PCT Pub. No.: WO2012/049230
PCT Pub. Date: Apr. 19, 2012

(65) Prior Publication Data
US 2014/0144416 A1    May 29, 2014

(30) Foreign Application Priority Data
Oct. 14, 2010   (DE) .......................... 10 2010 048 311

(51) Int. Cl.
F02M 25/08    (2006.01)
F02D 41/00    (2006.01)
(Continued)

(52) U.S. Cl.
CPC ....... *F02M 25/089* (2013.01); *F02D 41/0042* (2013.01); *F02D 41/144* (2013.01);
(Continued)

(58) Field of Classification Search
CPC . F02M 25/089; F02D 41/0042; F02D 41/144; F02D 41/1459
(Continued)

(56) References Cited

U.S. PATENT DOCUMENTS 4,550,286 A * 10/1985 Holland ............. B60G 17/0408
280/6.157
5,216,882 A * 6/1993 Kuroda ............... F02D 41/1459
123/688
(Continued)

FOREIGN PATENT DOCUMENTS

DE    195 09 310    9/1996
DE    600 19 002    3/2006
(Continued)

*Primary Examiner* — Sizo Vilakazi
*Assistant Examiner* — Kevin R Steckbauer
(74) *Attorney, Agent, or Firm* — Cozen O'Connor

(57) ABSTRACT

The internal combustion engine includes at least one cylinder, an exhaust gas tract having a measuring device, and a tank ventilation system having a purge air line, which provides pneumatic communication between the tank ventilation system and the cylinder. The purge air line has a sensor for ascertaining a hydrocarbon content of a gas flow from the tank ventilation system to the at least one cylinder. Fuel metering into the cylinder is controlled dependent on the ascertained hydrocarbon content. An exhaust gas characteristic of an exhaust gas flow that flows in the exhaust gas tract is detected by the measuring device and compared with a specified target value. If the ascertained difference between the detected exhaust gas characteristic and the specified target value exceeds a specified threshold, a test is carried out to determine whether the sensor has a malfunction.

10 Claims, 2 Drawing Sheets

(51) Int. Cl.
*F02D 41/14* (2006.01)
*F02D 41/22* (2006.01)

(52) U.S. Cl.
CPC ....... *F02D 41/1459* (2013.01); *F02D 41/222* (2013.01); *F02M 25/0809* (2013.01); *Y02T 10/40* (2013.01)

(58) Field of Classification Search
USPC .............. 123/516, 517, 518, 519, 520, 698; 73/114.39
See application file for complete search history.

(56) References Cited

U.S. PATENT DOCUMENTS

| | | | | |
|---|---|---|---|---|
| 5,823,171 | A | 10/1998 | Farmer et al. | |
| 6,176,217 | B1 * | 1/2001 | Ohkuma | F02M 25/08 123/295 |
| 6,325,052 | B1 * | 12/2001 | Mashiki | F02D 41/0045 123/520 |
| 6,332,456 | B2 * | 12/2001 | Mashiki | F02D 41/0045 123/520 |
| 6,505,599 | B1 * | 1/2003 | Mashiki | F02D 41/3076 123/295 |
| 6,568,240 | B1 * | 5/2003 | Sato | F02D 41/0045 73/1.07 |
| 6,739,177 | B2 * | 5/2004 | Sato | F02D 41/0037 73/114.71 |
| 8,161,944 | B2 * | 4/2012 | Moriya | F01N 3/0814 123/406.41 |
| 8,219,278 | B2 * | 7/2012 | Sawada | B01D 53/9409 701/30.3 |
| 8,554,446 | B2 * | 10/2013 | Sano | F02D 13/06 123/198 DB |
| 8,683,853 | B2 * | 4/2014 | Wakao | F02D 41/0025 73/114.42 |
| 8,695,573 | B2 * | 4/2014 | Bierl | F02D 41/0037 123/516 |
| 9,151,737 | B2 * | 10/2015 | Bierl | F02D 41/0045 |
| 2001/0011540 | A1 * | 8/2001 | Mashiki | F02D 41/0045 123/520 |
| 2002/0139360 | A1 * | 10/2002 | Sato | F02D 41/0037 123/698 |
| 2010/0059022 | A1 * | 3/2010 | Bierl | F02D 41/0032 123/478 |
| 2011/0137540 | A1 * | 6/2011 | Mai | F02D 41/004 701/103 |
| 2011/0174276 | A1 * | 7/2011 | Bierl | F02D 41/0037 123/518 |
| 2011/0251419 | A1 | 10/2011 | Friese et al. | |
| 2011/0289999 | A1 * | 12/2011 | Bierl | F02D 41/0045 73/1.06 |
| 2014/0144416 | A1 * | 5/2014 | Heinrich | F02D 41/0042 123/672 |

FOREIGN PATENT DOCUMENTS

| | | | |
|---|---|---|---|
| DE | 10 2008 060 246 | 6/2010 | |
| DE | 10 2008 060 646 | 6/2010 | |
| EP | 1 022 451 | 7/2000 | |
| EP | 1 022 451 A2 | 7/2000 | |
| EP | 1 022 451 B1 | 3/2005 | |
| JP | 2001182630 A * | 7/2001 | .......... Y02T 10/121 |
| WO | WO 2010/007019 | 1/2010 | |
| WO | WO 2010/076193 | 7/2010 | |
| WO | WO 2010/076196 | 7/2010 | |

* cited by examiner

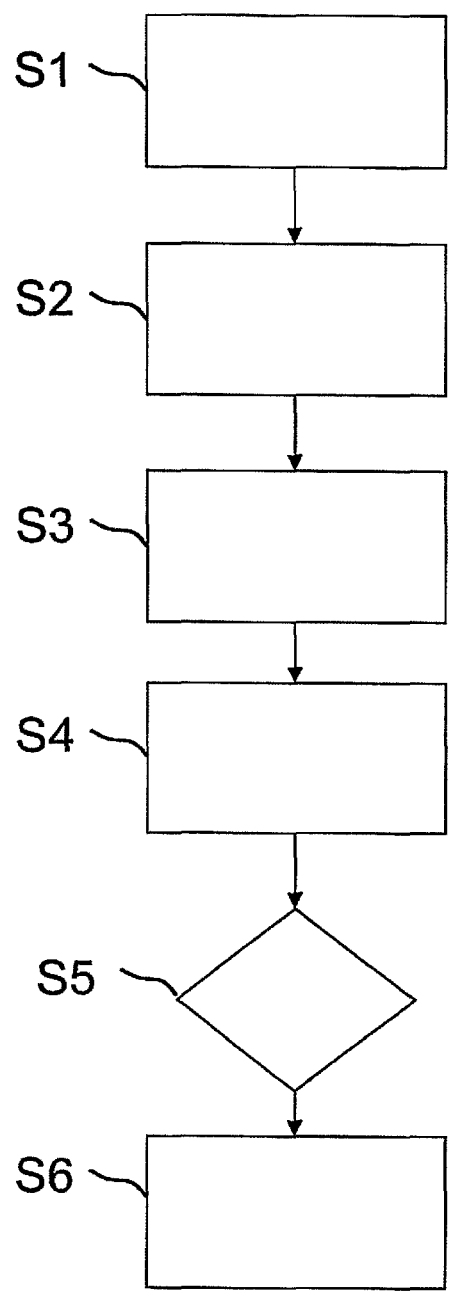

METHOD AND DEVICE FOR OPERATING AN INTERNAL COMBUSTION ENGINE

CROSS REFERENCE TO RELATED APPLICATIONS

This is a U.S. national stage of application No. PCT/EP2011/067850, filed on 13 Oct. 2011. Priority is claimed on German Application No. 10 2010 048 311.7 filed 14 Oct. 2010, the content of which is incorporated here by reference.

BACKGROUND OF THE INVENTION

1. Field of the Invention

The invention relates to a method and a device for operating an internal combustion engine in which a hydrocarbon content of a gas flow is determined as a function of a sensor signal.

2. Description of Prior Art

Increasingly stringent demands are being made of internal combustion engines in terms of their power and their efficiency. At the same time, the emissions of pollutants must also be low due to strict legal requirements. To avoid vaporization of hydrocarbons from a fuel tank to the atmosphere, internal combustion engines are mainly equipped with tank ventilation systems. To adsorb the hydrocarbon vapors, the tank ventilation systems are frequently equipped with activated carbon filters. Such activated carbon filters can only absorb a limited quantity of hydrocarbons and have to be regenerated, that is to say cleaned, at least when a specific degree of saturation is reached. The activated carbon filter can therefore serve as a buffer for the hydrocarbons released from the fuel, as a result of which the hydrocarbons which are released from the fuel can be fed in a predefined fashion to combustion in an internal combustion engine.

US 2002/0139360 A1 discloses an internal combustion engine which has a gas fuel concentration sensor located in an intake section of the internal combustion engine. The internal combustion engine also has an exhaust gas train with a measuring device and a tank ventilation system.

EP 1 022 451 A2 discloses a method and a device for precisely controlling the air fuel ratio in an internal combustion engine using a gas concentration sensor. Variation in the output signal of the gas concentration sensor during the starting of the engine is detected and a zero point correction is carried out in accordance with the variation in the output signal of the gas concentration sensor.

SUMMARY OF THE INVENTION

An object of the invention is a method and a corresponding device for operating an internal combustion engine which permit reliable operation of the internal combustion engine with a low level of pollutants.

One embodiment of the invention is a method and a corresponding device for operating an internal combustion engine. The internal combustion engine comprises at least one cylinder, an exhaust gas train with a measuring device, and a tank ventilation system with a purge air line. The purge air line is designed for pneumatic communication between the tank ventilation system and the at least one cylinder. The purge air line has at least one sensor for ascertaining a hydrocarbon content of a gas flow. A hydrocarbon content of a gas flow flowing from the tank ventilation system to the at least one cylinder is ascertained as a function of a measurement signal of the sensor. Furthermore, metering of fuel into the at least one cylinder is controlled as a function of the ascertained hydrocarbon content. In addition, an exhaust gas characteristic variable of an exhaust gas flow that flows in the exhaust gas train is detected by the measuring device and compared with a predefined setpoint value. If the ascertained absolute difference between the detected exhaust gas characteristic variable and the predefined setpoint value exceeds a predefined limiting value, it is checked whether the sensor has a malfunction.

A functional capability of the sensor for detecting the hydrocarbon content can be checked and/or monitored. The checking as to whether the sensor has a malfunction can take place, for example, depending on a predefined verification routine carried out by a suitably embodied engine control unit. For the checking and/or monitoring of the functional capability of the sensor it is possible to use a measuring device already present in contemporary systems, which permits a cost-effective implementation. It is advantageously possible to easily ensure in this way that the sensor for detecting the hydrocarbon content is functioning. This can make a contribution to the metering of fuel into the at least one cylinder being controlled reliably as a function of the ascertained hydrocarbon content, and as a result a most favorable possible ratio of fuel to air being reliably set in the internal combustion engine, thus permitting the internal combustion engine to be operated reliably and/or with low emissions of pollutants.

The control of the metering of fuel into the at least one cylinder as a function of the ascertained hydrocarbon content can, in a spark ignition engine, comprise switching over between a homogeneous operating mode and a stratified operating mode as a function of the ascertained hydrocarbon content and/or, in the case of a hybrid vehicle, switching over between an electric operating mode and a combustion operating mode of the hybrid vehicle as a function of the ascertained hydrocarbon content. The checking and/or monitoring of the functional capability of the sensor for detecting the hydrocarbon content can be a component of an on-board diagnostic system of a motor vehicle. As a result, a possible legal requirement for monitoring of all the systems that influence outputting of exhaust gas of a vehicle can be met. As a result, the advantages of controlling the quantity of fuel to be metered as a function of the ascertained hydrocarbon content can also be utilized for internal combustion engines in motor vehicles subject to such a requirement. Controlling the metering of fuel as a function of the ascertained hydrocarbon content of the gas flow can take place very quickly in terms of timing since a change in the ascertained hydrocarbon content has a direct influence on the quantity of fuel to be metered. Compared to regulating metering of fuel as a function of the exhaust gas characteristic variable, the control of the metering of fuel as a function of the hydrocarbon content of the gas flow can take place closer to real time.

It is advantageous to arrange the sensor in the purge air line. The sensor can alternatively or, if the system has a plurality of such sensors, additionally also be arranged in an intake section of the internal combustion engine and/or in a tank ventilation line.

In one embodiment, the exhaust gas characteristic variable represents an air/fuel ratio. This has the advantage that the exhaust gas characteristic variable can be very easily detected, for example with a lambda probe.

According to one embodiment, at least one operating characteristic variable of the internal combustion engine is detected and/or a state characteristic variable of the internal combustion engine is detected and the at least one operating characteristic variable and/or the at least one state variable is compared with a respectively predefined setpoint characteristic variable. In addition, it is ascertained, depending on a respective result of the comparison of the operating characteristic variable and/or state characteristic variable with the respective setpoint characteristic variable, whether the sensor has a malfunction. Depending on such an evaluation of one or more operating characteristic variables and/or state characteristic variables of the internal combustion engine, the malfunction of the sensor can advantageously be at least partially ruled out or confirmed. For example, the operating variable can represent an injected quantity of fuel and/or the state variable can represent an air mass flow in the purge air line.

In one embodiment, the hydrocarbon content of the gas flow is ascertained in a predefined operating range of the internal combustion engine and the hydrocarbon content ascertained in this way is compared with a predefined specific hydrocarbon setpoint value. Furthermore, it is ascertained, depending on a deviation between the ascertained hydrocarbon content and the predefined specific hydrocarbon setpoint value, whether the sensor has a malfunction. This permits an alternative or supplementary fault diagnosis for the sensor. For example, the hydrocarbon content can be ascertained if the internal combustion engine has the operating range which is characterized by the fact that complete purging of the adsorption container has currently taken place with the result that a hydrocarbon concentration in the purge air line is approximately zero.

A further operating range of the internal combustion engine can be characterized, for example, by virtue of the fact that the internal combustion engine is operated under full load and purging takes place with a maximum purge air mass flow. In this case, the hydrocarbon concentration cannot exceed a predefined upper limiting value.

BRIEF DESCRIPTION OF THE DRAWINGS

Exemplary embodiments of the invention are explained in more detailed below with reference to the schematic drawings, in which:

FIG. 2 is a flowchart of a program for operating an internal combustion engine.

Elements with the same design or function are provided with the same reference symbols in all the figures.

DETAILED DESCRIPTION OF THE PREFERRED EMBODIMENTS

Figure 1:
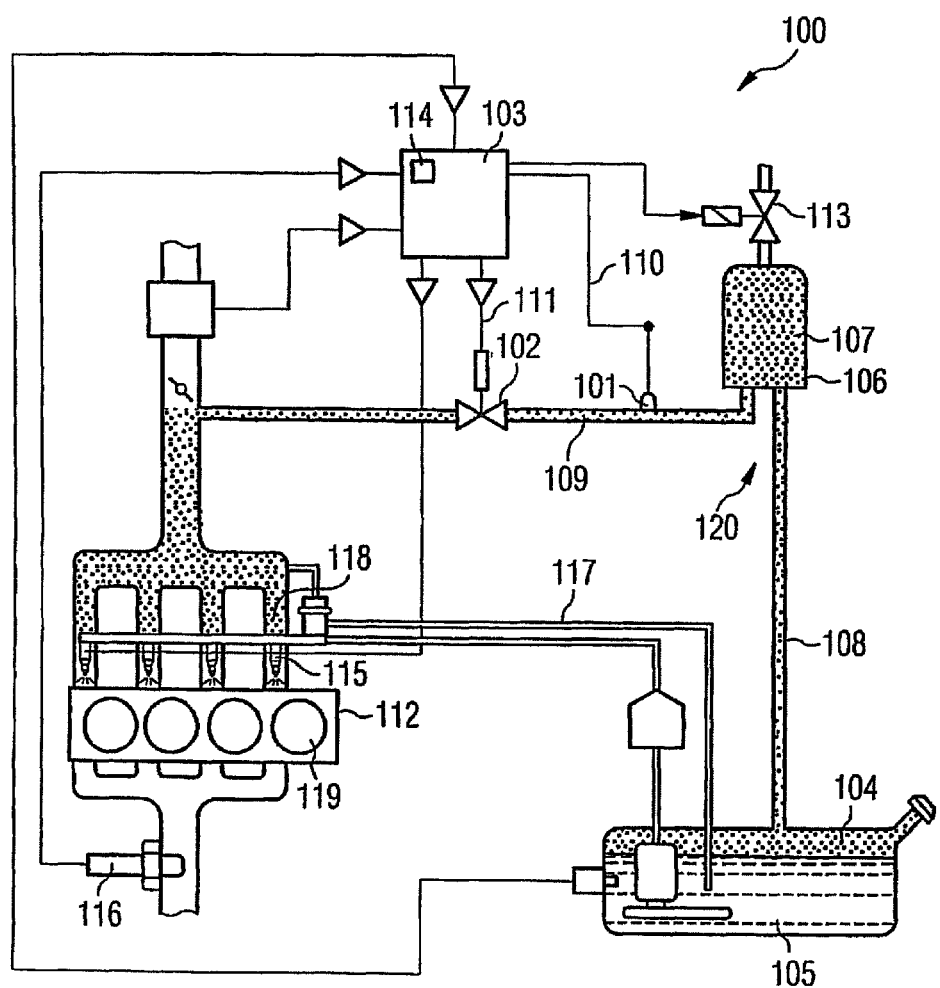
FIG. 1 is a schematic illustration of an internal combustion engine.

FIG. 1 shows an internal combustion engine assembly 100 which has a fuel tank 104, an internal combustion engine 112 and a tank ventilation system 120. The internal combustion engine can be arranged, for example, in a motor vehicle. The tank ventilation system 120 comprises an adsorption container 106 coupled to the fuel tank 104 via a tank ventilation line 108. The adsorption container 106 is coupled via a purge air line 109 to the internal combustion engine 112, in particular to an intake section 118 of the internal combustion engine. The internal combustion engine 112 comprises at least one cylinder 119, and the purge air line 109 is designed for pneumatic communication between the tank ventilation system 120 and the at least one cylinder 119.

Liquid fuel 105, for example gasoline, is stored in the fuel tank 104. Hydrocarbons, for example methane, butane or propane evaporate from the fuel 105. The various hydrocarbon chains have different vaporization temperatures, with the result that, depending on the external temperature, different hydrocarbons are released from the liquid fuel 105. The higher the external temperature, and therefore the temperature of the fuel 105, the more hydrocarbons change into the gas phase.

The gaseous hydrocarbons which form in the fuel tank 104 are conducted into the adsorption container 106 via the tank ventilation line 108.

The adsorption container 106 comprises, for example, an activated carbon filter for temporarily storing the hydrocarbons which are outgassing from the fuel tank 104. Such an activated carbon filter can only buffer a limited quantity of hydrocarbons. The activated carbon filter must therefore be regenerated, that is to say the hydrocarbons absorbed therein must be removed from it. The adsorption container 106 therefore has, for example, an air duct in which air can flow from the surroundings into the adsorption container 106.

A controllable valve 113 can be arranged in the air duct and also in the tank ventilation line, respectively.

The adsorption container 106 is connected to the intake section 118 of the internal combustion engine 112 by the purge air line 109. The purge air valve 102 is arranged in the purge air line 109. For example purging of the adsorption container 106 can be controlled by actuating the purge air valve 102 by a suitably formed engine controller 103. For example, a degree of opening of the purge air valve 102 for purging the adsorption container 106 can be set as a function of a predefined operating range of the internal combustion engine 112 or combustion engine assembly 100 and/or of a predefined degree of loading of the adsorption container 106 and/or of the hydrocarbon concentration of the purge air in the purge air line 109.

The internal combustion engine assembly 100 has at least one sensor 101. The sensor 101 is designed, for example, to detect a measurement signal which is representative of a hydrocarbon content of a gas flow. The sensor 101 can be designed to detect a temperature of the gas flow evaluated as a measure for the hydrocarbon content in the gas flow. The sensor can also be designed to measure a mass flow of the hydrocarbons in the gas flow. The internal combustion engine assembly 100 can also have a plurality of such sensors 101. It is advantageous if at least one of the sensors 101 is arranged on the purge air line 109. Alternatively or additionally, the sensor 101 can be arranged upstream of the cylinders 119, for example on the adsorption container 106 and/or on the intake section 118. The sensor 101 can also be arranged on further lines for example on the tank ventilation line 108.

The valve 102 is coupled via an electrical line 111 to the engine controller 103. The at least one sensor 101 is coupled to the engine controller via an electrical line 110. The engine controller 103, which has an evaluation device 114, controls the purge air valve 102.

The fuel 105 can be fed via a fuel delivery unit and via fuel lines 117 to the internal combustion engine 112 where it is injected via injection valves 115 into the intake section 118 or into the cylinders 119 and is burnt in the internal combustion engine. The injection valves 115 comprise, in one embodiment, electromagnetic injection valves which can be controlled by means of electrical signals, and it is also possible for other embodiments of injection valves 115 to be arranged.

Since a certain quantity of energy is fed to the internal combustion engine by the hydrocarbons in the intake air, correspondingly less fuel can be injected via the injection valves 115. Evaluation unit 114, which is part of the engine controller 103, evaluates the signals of the sensor 101, with the result that, for example, the concentration of hydrocarbons and the mass flow of the gas flow through the purge air line 109 are known. It is therefore known how much energy in the form of gaseous hydrocarbons is fed to the internal combustion engine. Metering of fuel into the at least one cylinder 119 is controlled as a function of the ascertained hydrocarbon content of the gas flow. The engine controller 103 controls, for example, the injection valves 115 correspondingly, with the result that less fuel is injected if more hydrocarbon is fed in via the intake air.

The quantity of fuel injected into the internal combustion engine via the injection valves 115 is determined by the sensors, which are arranged upstream of the cylinders 119, and the evaluation device 114. An actuator or a plurality of actuators are controlled based on this data, with the result that fabrication tolerances and aging effects of the actuators, for example of the valve 102 or of the injection valves 115, can also be taken into account in the controller 103.

The exhaust gases of the combustion process are conveyed away from the engine through an exhaust gas train. Arranged in the exhaust gas train is a measuring device 116 which is designed to detect an exhaust gas characteristic variable of an exhaust gas flow. The exhaust gas characteristic variable can advantageously be representative of an air/fuel ratio λ. For example, the measuring device 16 can have a lambda probe by which the air/fuel ratio λ can be ascertained.

The exhaust gas characteristic variable which is detected by the measuring device 116, for example the air/fuel ratio λ, is transmitted to the evaluation unit 114. The evaluation unit 114 is designed, for example, to compare the exhaust gas characteristic variable with a predefined setpoint value and to check whether the sensor 101 has a malfunction if the ascertained absolute difference between the detected exhaust gas characteristic variable and the predefined setpoint value exceeds a predefined limiting value.

In FIG. 2, a program for operating the internal combustion engine 100 is illustrated as a flowchart. The engine controller is designed, for example, to carry out the program. The engine controller 103 can also be referred to as a device for operating the internal combustion engine.

In a first step S1 of the program for operating an internal combustion engine, the program is started, which can occur in real time with respect to starting of the internal combustion engine.

In a second step S2, the hydrocarbon content of the gas flow which flows through the purge air line is ascertained. Alternatively or additionally, the hydrocarbon content in the intake section can be ascertained.

In a step S3, the metering of fuel to the internal combustion engine is controlled as a function of the hydrocarbon content. For example, step S3 comprises controlling at least one injection valve as a function of the ascertained hydrocarbon content.

In a step S4, an exhaust gas characteristic variable of an exhaust gas flow which flows in the exhaust gas train is detected.

In a step S5, the exhaust gas characteristic variable is compared with a predefined setpoint value.

If the identified absolute difference between the detected exhaust gas characteristic variable and the predefined setpoint value exceeds a predefined limiting value, in a step S6 it is checked whether the sensor 101 has a malfunction. For checking whether the sensor 101 has a malfunction it is possible, for example, to start one or more subprogram routines.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an internal combustion engine having at least one cylinder, an exhaust gas train having a measuring device, a tank ventilation system having a purge air line configured to provide pneumatic communication between the tank ventilation system and the at least one cylinder, and at least one sensor arranged in the purge air line for ascertaining a hydrocarbon content of a gas flow, the method comprising:

operating the internal combustion engine at full load;

purging the tank ventilation system with a maximum air flow, wherein a hydrocarbon concentration between the tank ventilation system and the at least one cylinder cannot exceed a predefined constant upper limiting value;

ascertaining a hydrocarbon content of a gas flow flowing in the purge air line from the tank ventilation system to the at least one cylinder based at least in part on a measurement signal of the at least one sensor;

controlling metering of fuel into the at least one cylinder based at least in part on the ascertained hydrocarbon content by selecting one of a homogeneous operating mode and a stratified operating mode;

determining a quantity of fuel injected into the internal combustion engine and determining fabrication tolerances and aging effects of at least one of an injection valve and a purge line valve based on the determination;

detecting an exhaust gas characteristic variable of an exhaust gas flow that flows in the exhaust gas train by the measuring device;

comparing the exhaust gas characteristic variable with a predefined setpoint value, wherein the predefined setpoint value is greater than zero; and checking whether the at least one sensor has a malfunction when an ascertained absolute difference between the detected exhaust gas characteristic variable and the predefined setpoint value exceeds a predefined limiting value by:

ascertaining a hydrocarbon content of the gas flow during a purge process of the internal combustion engine;

comparing the ascertained hydrocarbon content of the gas flow during the purge process with a specific hydrocarbon setpoint value predefined for an operating range; and determining if the sensor has the malfunction based at least in part on a deviation between the ascertained hydrocarbon content of the gas flow during the purge process and the predefined specific hydrocarbon setpoint value.

2. The method as claimed in claim 1, wherein the exhaust gas characteristic variable represents a pneumatic air/fuel ratio.

3. The method as claimed in claim 1, further comprising:
at least one of:
detecting at least one operating characteristic variable of the internal combustion engine and
ascertaining a state characteristic variable of the internal combustion engine;
comparing the at least one of the at least one operating characteristic variable and the state characteristic variable with a respectively predefined setpoint characteristic variable; and
ascertaining whether the sensor has the malfunction based at least in part on a respective result of the comparison of the at least one operating characteristic variable and the state characteristic variable with the respective setpoint characteristic variable.

4. A device for operating an internal combustion engine having at least one cylinder, an exhaust gas train having a measuring device, a tank ventilation system with a purge air line configured for pneumatic communication between the tank ventilation system and the at least one cylinder, and at least one sensor for ascertaining a hydrocarbon content of a gas flow, wherein the device is configured to:
operate the internal combustion engine at full load;
purge the tank ventilation system with a maximum air flow, wherein a hydrocarbon concentration between the tank ventilation system and the at least one cylinder cannot exceed a predefined constant upper limiting value;
to ascertain a hydrocarbon content of a gas flow flowing in the purge air line from the tank ventilation system to the at least one cylinder based at least in part on a measurement signal of the at least one sensor;
control metering of fuel into the at least one cylinder based at least in part on the ascertained hydrocarbon content by selecting one of a homogeneous operating mode and a stratified operating mode;
determine a quantity of fuel injected into the internal combustion engine and determining fabrication tolerances and aging effects of at least one of an injection valve and a purge line valve based on the determination;
detect an exhaust gas characteristic variable of an exhaust gas flow that flows in the exhaust gas train by the measuring device;
compare the exhaust gas characteristic variable with a predefined setpoint value, wherein the predefined setpoint value is greater than zero; and
check whether the at least one sensor has a malfunction when an ascertained absolute difference between the detected exhaust gas characteristic variable and the predefined setpoint value exceeds a predefined limiting value by:
ascertaining the hydrocarbon content of the gas flow during a purge process of the internal combustion engine;
comparing the hydrocarbon content of the gas flow during the purge process with a specific hydrocarbon setpoint value predefined for an operating range, and
ascertaining whether the sensor has the malfunction based at least in part on a deviation between the ascertained hydrocarbon content of the gas flow during the purge process and the predefined specific hydrocarbon setpoint value.

5. The method as claimed in claim 1, further comprising:
launching at least one subprogram after the detection of a malfunction.

6. The method as claimed in claim 5, wherein the at least one subprogram comprises at least one of an alternative fault diagnosis for the sensor and a supplementary fault diagnosis for the sensor.

7. The method as claimed in claim 3, further comprising:
launching at least one subprogram after the detection of a malfunction.

8. The method as claimed in claim 7, wherein the at least one subprogram comprises at least one of an alternative fault diagnosis for the sensor and a supplementary fault diagnosis for the sensor.

9. The device as claimed in claim 4, wherein the device is further configured to:
launch at least one subprogram after the detection of a malfunction.

10. The device as claimed in claim 9, wherein the at least one subprogram comprises at least one of an alternative fault diagnosis for the sensor and a supplementary fault diagnosis for the sensor.

* * * * *